Patented Apr. 13, 1937

2,076,901

UNITED STATES PATENT OFFICE 2,076,901

MANUFACTURE OF VITAMINE A PREPARATION

Fritz Laquer, Wuppertal-Vohwinkel, and Paul von Dobeneck, Wuppertal-Elberfeld, Germany, assignors to Winthrop Chemical Company, Inc., New York, N. Y., a corporation of New York No Drawing. Application July 21, 1933, Serial No. 681,664. In Germany July 29, 1932

6 Claims. (Cl. 167—81)

This invention relates to improvements in the manufacture of a vitamine A preparation.

It is known that preparations containing vitamine A in a concentrated form are obtainable by saponification of the train oils of fish livers and extraction of the saponification mixture by means of organic solvents. The known processes have, however, the disadvantage that the quantities of the liquids required for the saponification and for the extraction process are relatively high as compared with the quantity of the starting material. Thus, for instance, it is necessary to dilute the saponification mixture of a fish train oil with at least ten times its quantity of water in order to render a subsequent extraction of the saponification mixture possible, since without the dilution of the mixture an emulsion between the extracting medium and the strong soap solution is formed which practically prevents the isolation of the active vitamine principle. In view of the large volume of the solution to be extracted, of course, a relatively high quantity of the extracting solvent is required. The necessity of large volumes in such processes, on the other hand, must result in the requirement of large apparatus.

The present invention provides for a process of manufacturing a preparation containing vitamine A in a concentrated form which process is free from the disadvantages referred to above. In accordance with the present invention it is possible to manufacture the said vitamine A preparation while using a quantity of the saponifying and extracting media which is altogether as low as, for instance, five times the quantity of the starting material.

One feature of the invention consists in the saponification of the fish liver itself by means of about an equal part of about 30% alkali metal hydroxide solution in an aqueous alcohol. Fish livers which are usual for obtaining vitamine containing train oils, for instance, livers of cod-fish, halibut, mackerel-pike and tuna-fish may be employed in the said process. The saponification process is advantageously performed in an inert atmosphere, for instance, while passing through a stream of nitrogen and while stirring and heating the mixture at about 60° C. When using, for instance, three quarters of the quantity of the liver of about 30% caustic potash solution in about 50% aqueous alcohol the saponification is substantially completed after about one hour's heating to 60° C. When using lower temperatures in the saponification process, of course, a longer reaction time is required. For the preparation of the alcoholic alkali metal hydroxide solutions the lower alcohols which are miscible with water, such as methyl, propyl and preferably ethyl alcohol may be used. The use of a 30% solution of the alkali metal hydroxide in, for instance, 50% aqueous alcohol has proved particularly advantageous, but it is obvious for those skilled in the art that instead of 30% also, for instance, 20% or 40% of alkali metal hydroxide may be contained in the aqueous-alcoholic alkali metal hydroxide solution. The term "about 30%" is, therefore, intended to include also concentrations, such as 20% and 40% of the alkali metal hydroxide. Similarly the aqueous alcohol used for the preparation of the alkali metal hydroxide may also contain, for instance, 40% or 60% of an alcohol miscible with water instead of the 50% mentioned above.

Another feature of the present invention consists in the addition of a relatively small quantity of an aqueous alcoholic solution to the saponification mixture prior to the extraction by an organic lipoid solvent. The aqueous alcohol is added only in a quantity which is in the same order of magnitude as the quantity of the saponification mixture, that is it may be equal or somewhat more or less. When adding such a quantity of an aqueous alcohol it is advisable to take care that the proportion of water to alcohol in the whole mixture equals about 3:2. When using a 50% aqueous alcohol as the solvent of the alkali metal hydroxide the said proportion is obtained by the addition of about three parts of a 40% alcohol to one part of the said 50% alcohol.

The diluted saponification mixture obtained as described above is then extracted by means of a lipoid solvent which is immiscible with water, such as petroleum ether, benzine, ligroin, ether, trichloroethylene, dichloroethane, chloroform and the like. The extracting solvent is advantageously used in a quantity which is about equal to the volume of the diluted saponification mixture. The extract thus obtainable contains, after the evaporation of the solvent, vitamine A in a concentrated form. In view of the instability of vitamine A to oxygen care should be taken to exclude oxygen during all operations as much as possible.

The invention is further illustrated by the following example but it is not restricted thereto:

*Example.*—100 kgs. of fish liver are mixed with 50 kgs. of 50% aqueous ethyl alcohol and 20 kgs. of potassium or sodium hydroxide. The mixture is heated to 60° C. during one hour while stirring and passing through a stream of nitrogen. The saponification mixture is then dissolved in 150 kgs. of ice cold 40% aqueous ethyl alcohol and the liquid obtained is extracted by means of 300 kgs. of a lipoid solvent immiscible with water, for instance, ether, petroleum ether or ligroin. The extract obtained is freed from the solvent by evaporation. The residue containing the vitamine A in a concentrated form may be used directly or may be further purified as, for instance, indicated in Biochemical Journal 19 (1925), page 1051.

We claim:—

1. In the process of manufacturing a vitamine A concentrate the improvement which consists in treating fish liver directly with about an equal part of about 30% aqueous alcoholic caustic alkali metal hydroxide solution to saponify the fish liver oil in the presence of the liver.

2. In the process of manufacturing a vitamine A concentrate the improvement which consists in treating fish liver directly with about half its quantity of about 30% solution of an alkali metal hydroxide in about 50% aqueous ethyl alcohol in an inert atmosphere while heating to about 60° C. to saponify the fish liver oil in the presence of the liver.

3. The process which consists in treating vitamine containing fish liver directly with about an equal part of about 30% aqueous-alcoholic alkali metal hydroxide solution to saponify the fish liver oil in the presence of the liver, adding to the saponification mixture about an equal part of about 40% aqueous alcohol and extracting the mixture obtained by means of a lipoid solvent which is immiscible with water.

4. The process which consists in treating vitamine containing fish liver directly with about half its quantity of about 30% solution of an alkali metal hydroxide in about 50% aqueous ethyl alcohol in an inert atmosphere while heating to about 60° C. to saponify the fish liver oil in the presence of the liver, adding to the saponification mixture about an equal part of about 40% aqueous ethyl alcohol and extracting the mixture obtained by means of about an equal part of a lipoid solvent which is immiscible with water.

5. The process which consists in treating vitamine containing fish liver directly with about half its quantity of about 30% caustic potash solution in about 50% aqueous ethyl alcohol in an inert atmosphere while heating to about 60° C. to saponify the fish liver oil in the presence of the liver, adding to the saponification mixture about an equal part of about 40% aqueous ethyl alcohol and extracting the mixture obtained by means of about an equal part of ligroin.

6. The process which consists in treating vitamine containing fish liver directly with about half its quantity of about 30% caustic potash solution in about 50% aqueous ethyl alcohol in an inert atmosphere while heating to about 60° C. to saponify the fish liver oil in the presence of the liver, adding to the saponification mixture about an equal part of about 40% aqueous ethyl alcohol and extracting the mixture obtained by means of about an equal part of ether.

FRITZ LAQUER.
PAUL von DOBENECK.